Figure 3:
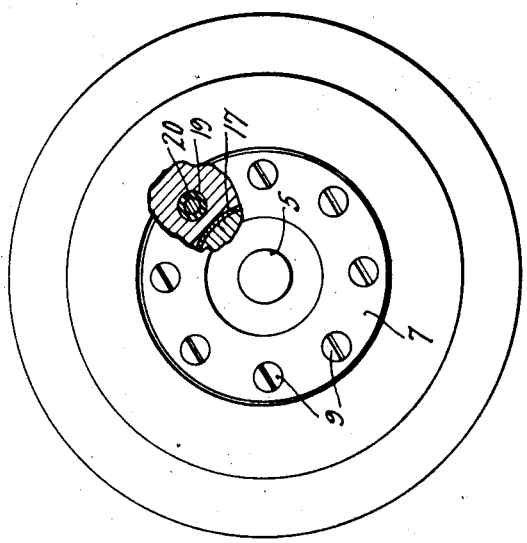

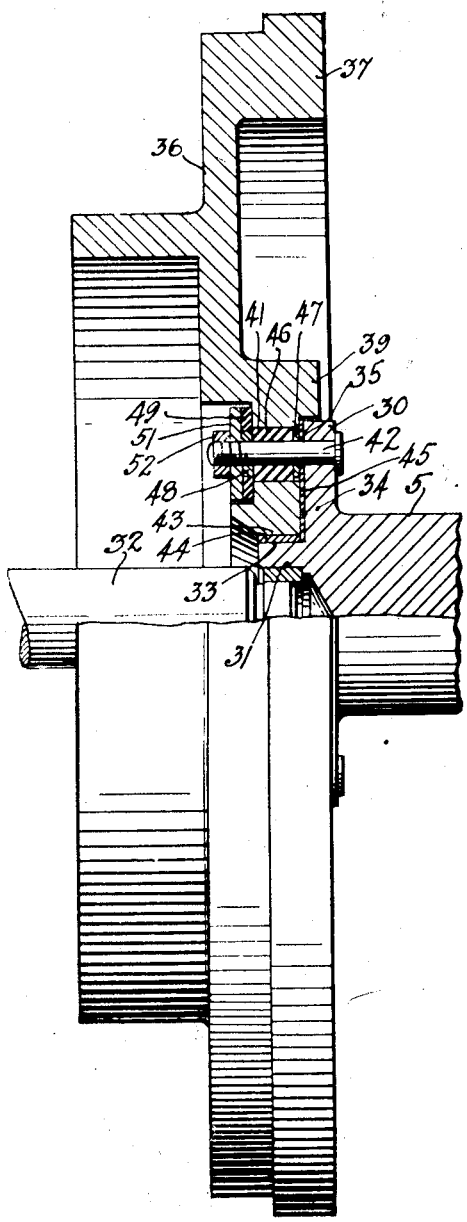
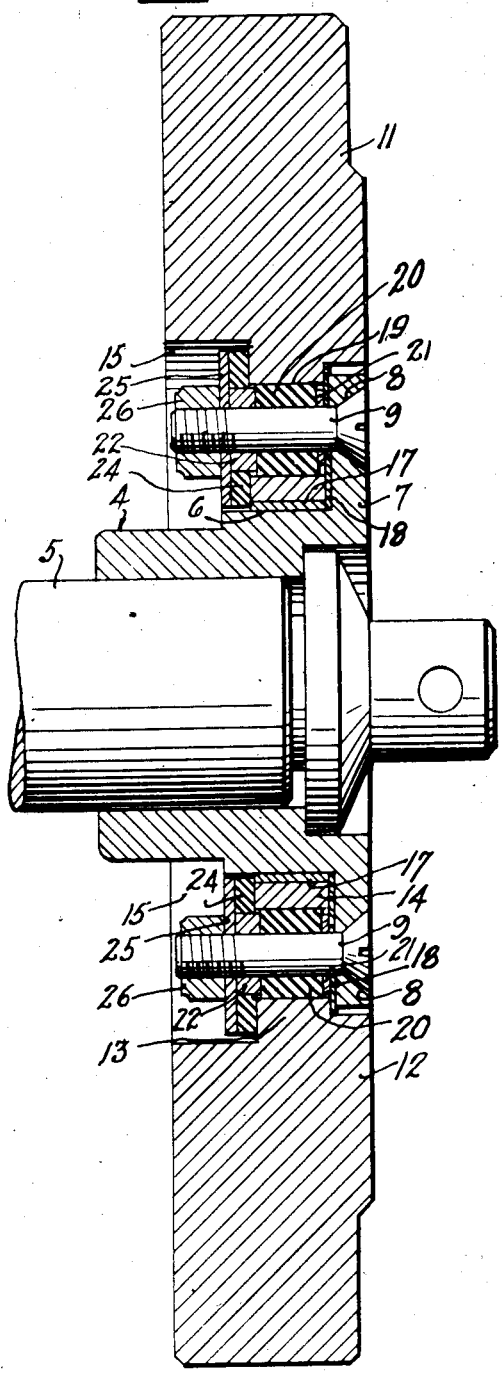

Feb. 12, 1929.  H. WALKER  1,701,518
VIBRATION DAMPING FLYWHEEL
Filed Dec. 4, 1925   2 Sheets-Sheet 2

INVENTOR
Hiram Walker
BY Albert M. Austin
ATTORNEY

Patented Feb. 12, 1929.

1,701,518

UNITED STATES PATENT OFFICE.

HIRAM WALKER, OF EAST CLEVELAND, OHIO, ASSIGNOR TO CHANDLER MOTOR CAR COMPANY, OF CLEVELAND, OHIO, A CORPORATION OF OHIO.

VIBRATION-DAMPING FLYWHEEL.

Application filed December 4, 1925. Serial No. 73,080.

This invention relates to vibration damping devices for controlling and suppressing vibration in rotating machine elements, and more particularly, to such devices for controlling and suppressing vibration in rotating machine elements caused by intermittent torque impulses such as are present in internal combustion engines.

The invention relates particularly to the elimination of tortional deflections such as are present in the crank shafts of usual internal combustion engines and from the corresponding vibration which may be set up due to these deflections, especially in cases where the vibrations may be in resonance with the period of the engine.

The invention relates to the provision of a flexible or cushioning action between the crank shaft which may have the intermittent torque impulses supplied thereto and the torque restricting element such as the momentum element of a flywheel. A rigid connection between the crank shaft and the momentum element causes a definite tortional deflection in the crank shaft each time an impulse of power is supplied thereto. As above pointed out, this tortional deflection may cause undesirable and troublesome vibration resulting not only in noisy and uneven running qualities but in premature destruction of the engine.

According to the invention the crank shaft may be connected to the momentum element by providing soft or resilient cushion bushings between the parts in order to take up and dampen the tortional deflection between the crank shaft or other drive shaft and the moment element. A further feature of the invention is the provision of means for binding the soft and resilient cushioning members so that they cannot be squeezed out of their holding spaces.

The invention may be applied to flywheels which are adapted for use either on the front of an internal combustion engine or at the rear thereof. Furthermore, the invention may be used with flywheels through which the power for driving a load must be transmitted. An example of this condition is the rear flywheel of an internal combustion engine as used on some types of automobiles. The invention may also be used with flywheels through which no power must be transmitted such as the front flywheel of an internal combustion engine as used on some types of automobiles.

The invention also relates to an improved construction of flywheel which will be a self-contained unit and which will have the general appearances of an ordinary flywheel, which will be easy to install and which will be of durable and rugged construction.

Various other objects and advantages of the invention will be obvious from the following particular description of different forms of devices embodying the invention or from an inspection of the accompanying drawings; and the invention also consists in certain new and novel features of construction and combinations of parts hereinafter set forth and claimed.

Figure 4:
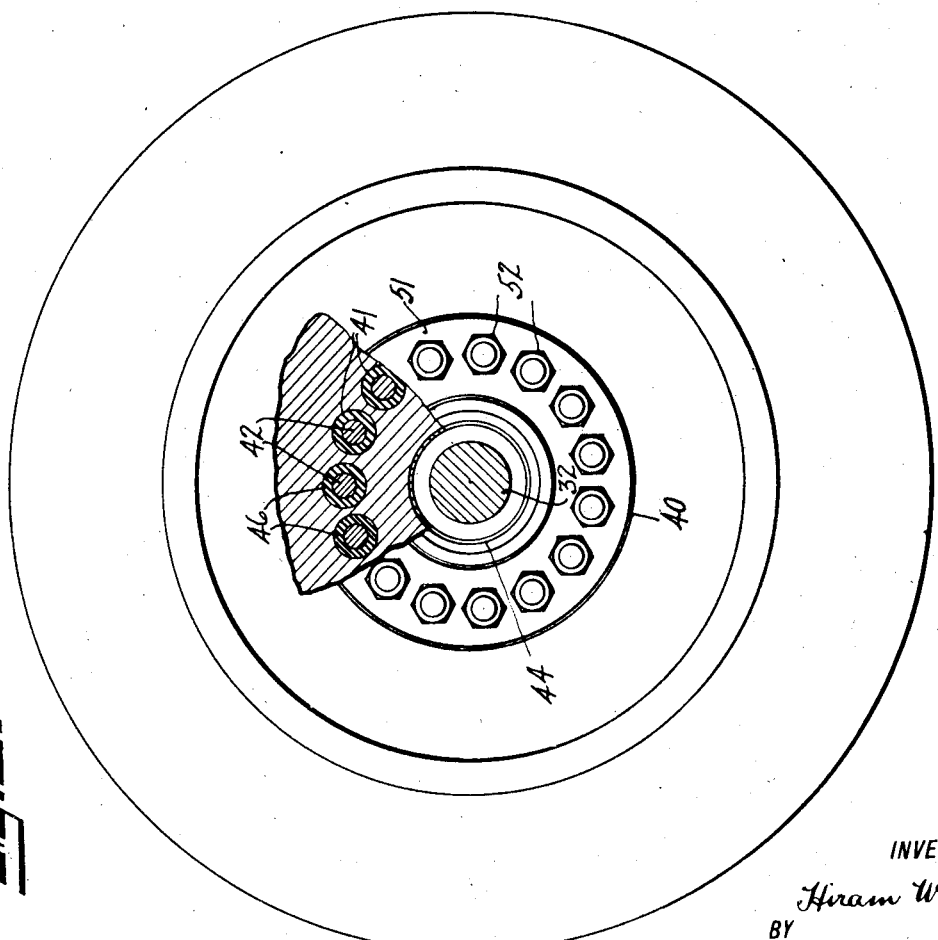

In the accompanying drawings I have shown for purposes of illustration two forms of devices embodying the invention, in which Fig. 1 is an elevation in section of a flywheel according to the invention adapted for use on the front of the engine;

Fig. 2 is an elevation partly in section of a flywheel according to the invention, such as may be used at the rear of the engine; and Figs. 3 and 4 are end views of Figs. 1 and 2 respectively, parts being broken away to show details of construction.

In the following description and in the claims parts will be identified by specific names for convenience, but they are intended to be as generic in their application to similar parts as the art will permit.

Referring now to the drawing and more particularly to Figs. 1 and 3, the front flywheel may comprise a hub member 4 adapted to be rigidly secured to the crank shaft 5. The hub 4 may be provided with a journal portion 6 with a radial disk 7 at the front end thereof. The disk 7 may be provided with a plurality of spaced annularly disposed bolt holes 8 through which may project a plurality of bolts 9. The flywheel may further comprise a rim part 11 made up of a momentum member 12 in which may be concentrated the greatest mass of the flywheel and a radial inwardly projecting flange 13 provided with a pilot bearing 14 for a purpose hereinafter described more in detail.

On the front side of the flange 13 may be provided an annular space to accommodate the radial disk 7. On the other side of the flange 13 may be provided a second annular space 15 for a purpose hereinafter described more in detail.

In order to insure that the rim part 11 will always bear a constant relation radial to the hub 4 a graphite bronze bearing 17 may be interposed between the pilot bearing 14 and the journal 6. This insures also a good bearing surface to allow relative movement between the rim part 11 and the hub 4 without premature wearing of the parts with resulting unbalance of the flywheel.

In order to prevent too much heat from being conducted from the engine to the resilient members used to obtain the desired cushioning effect, a ring 18 of any good heat non-conducting material such as bakelite may be interposed between the flange 13 and the disk 7. Heat tends to char and destroy certain kinds of resilient material which may be used to obtain the desired cushioning effect. The inwardly projecting flange 13 may have a plurality of holes 19 in line with the bolt holes 8. In each of these holes 19 may be placed a bushing 20 of resilient material such as rubber. Disposed on the inner end of each resilient bushing may be a metal washer 21; similarly on the outer end of each bushing 20 may be a metal washer 22. Disposed within the annular recess 15 may be a flat ring 24 of resilient material having holes to accommodate the outer metal washers 22. Disposed against the flat resilient ring 24 may be a flat metal ring 25 having holes to accommodate the bolts 9. Nuts 26 may be threaded on the bolts 9 to clamp the parts together.

It will be noted that each of the resilient members, namely, the bushings 20 and the flat resilient ring 24, is bound on all sides by metal members so that no matter how tightly the parts are drawn together by the nuts 26 the resilient members cannot be squeezed out of their places. This provision is a very important one and not only gives a definite cushioning action to absorb the shocks caused by the intermittent power impulses applied to the shaft, but greatly increases the life of the resilient members.

Referring now to the construction shown in Figs. 2 and 4, the rear flywheel arrangement may have its hub 30 integral with or a part of the crank shaft 5. The hub or crank shaft may have in its rear end a suitable bearing 31 lined with graphite bronze bushing to accommodate the clutch shaft 32 of an automobile, as is well understood in the art.

The hub member 30 may be provided with a journal 33 and a radial disk 34 at the forward end of the journal. The disk 34 may be provided with a plurality of bolt holes 35 in which bolts 42 may be positioned for a purpose hereinafter described more in detail.

The rim part 36 may comprise a momentum member 37 into which most of the weight of the flywheel may be placed and which may be adapted to have operative engagement with the clutch device (not shown) for operatively connecting the crank shaft 5 to the rear wheels of the automobile or other load mechanism. The rim part 36 may further comprise an inwardly projecting flange 39 having on the forward side a recess adapted to accommodate the disk 34. On the rear side of the inwardly projecting flange 39 may be provided an annular recess 40 and through the flange may be passed holes 41 in line with the bolt holes 35.

The flange 39 may be provided with a pilot bearing surface 43 between which and the journal 33 may be disposed a graphite bronze bushing 44 to provide a good bearing medium to allow relative rotary movement between the rim part 36 and the hub 30 and at the same time preserve a fixed distance radially between these parts.

A flat bakelite ring 45 may be disposed between the disk 34 and the flange 39 to prevent too much heat being conducted from the crank shaft to the rim part 36 thereby destroying the resilient material used to obtain the desired cushioning effect. Bushings of resilient material such as rubber may be provided surrounding the bolts 42 and in the holes 41. These bushings 46 may be suitably bound on the inside by metal washers 47 and on the outside by metal washers 48. Disposed in the annular recess 40 may be a flat annular ring 49 of resilient material such as rubber having holes to accommodate the outer washers 48. Also disposed in the annular recess 40 may be a flat metal ring 51 having holes to accommodate the bolts 42. The bolts may have nuts 52 disposed thereon so that the entire assembly may be clamped together.

In this construction, as in the front flywheel, it will be noted the resilient members are suitably bound on all sides by metal members so that the nuts 52 may be tightened on the bolts 42 the desired amount, and the desired amount of tortional deflection may be allowed without squeezing the resilient material out of its place, and also providing a good, efficient cushioning action. Furthermore, in both the front and rear constructions the bolts and nuts are disposed in such position that they do not project appreciably out of the general contour of the flywheel thereby reserving a unitary appearance and preventing possible damage by projections catching on any objects which might be the case if the bolts projected out any substantial distance.

The construction according to the invention while it allows a relative rotary movement between the hub or crank shaft and the rim part does not allow any relative radial movement. A radial movement may create other unbalances in the rotating parts which may cause more trouble than the tortional deflections. According to the invention tortional forces are now absorbed in the resilient bushings, and since the resilient bushings are properly bound, no amount of stress can cause them to break or deteriorate. The flat resilient rings furthermore allow the parts to be drawn up tightly by the bolts and nuts thereby obviating play longitudinally between the hub and rim parts and yet not interfering with the relative rotary movement between these parts.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

Having described my invention, I claim:

1. A vibration-damping flywheel comprising a hub adapted to be rigidly secured to a rotatable shaft, said hub having a journal and a radial disk at one end of said journal, said disk being provided with annularly disposed bolt holes, a rim part having a momentum member and a radial inwardly projecting flange and having on one side of said flange a space to accommodate said radial disk, said flange having holes in line with said bolt holes and on its other side an annular recess concentric with said holes, said flange having a pilot bearing, a graphite bronze bearing ring between said journal and bearing, a flat bakelite ring between said flange and disk, bolts in said bolt holes, cushioning bushings in said second holes surrounding said bolts, a metal washer on each inner and outer side of each of said bushings, a flat cushioning ring in said recess and having holes to accommodate the outer metal washers, a flat metal ring in said recess having holes to accommodate said bolts, and nuts fitting said bolts for holding said rings in said recess.

2. A vibration-damping flywheel comprising a hub adapted to be rigidly secured to a rotatable shaft, said hub having a journal and a radial disk, said disk being provided with annularly disposed bolt holes, a rim part having a momentum member and a radial inwardly projecting flange and having on one side of said flange a space to accommodate said radial disk, said flange having holes in line with said bolt holes and on its other side an annular recess concentric with said holes, said flange having a bearing, a graphite bronze bearing ring between said journal and bearing, bolts in said bolt holes, cushioning bushings in said second holes surrounding said bolts, a flat rubber ring in said recess and having holes to accommodate said bolts, a flat metal ring in said recess having holes to accommodate said bolts and nuts fitting said bolts for holding said rings in said recess.

3. A vibration-damping flywheel comprising a hub adapted to be rigidly secured to a rotatable shaft, said hub having a journal and a radial disk, said disk being provided with annularly disposed bolt holes, a rim part having a momentum member and a radial inwardly projecting flange and having on one side of said flange a space to accommodate said radial disk, said flange having holes in line with said bolt holes and on its other side an annular recess concentric with said holes, said flange having a bearing, bolts in said bolt holes, cushioning bushings in said second holes surrounding said bolts, a flat cushioning ring in said recess having holes to accommodate the outer metal washers, a flat metal ring in said recess having holes to accommodate said bolts, and means for holding said rings in said recess, and means for seating said journal in said bearing to allow relative rotary movement but no radial movement therebetween.

4. A vibration-damping flywheel comprising a hub adapted to be rigidly secured to a rotatable shaft, said hub having a journal and a radial disk, a rim part having a momentum member and a radial inwardly projecting flange, said flange having a plurality of annularly disposed holes and a pilot bearing cooperating with said journal, cushioning bushings in said holes, and means for securing said disk to said flange including fastening devices passing through said bushings.

5. A vibration-damping wheel comprising a hub member adapted to be rigidly secured to a rotatable shaft, a rim member, and means for resiliently connecting said members including a flange having a hole spaced from the axis of rotation and secured to one of said members, a disk secured to the other of said members and having a bolt passing through said hole, a cushioning bushing around said bolt in said hole, a metal washer surrounding said bolt for retaining said bushing in said hole and means on said bolt for holding said washer in place, and compressing said bushing.

6. A vibration-damping wheel comprising a hub member adapted to be rigidly secured to a rotatable shaft, a rim member, and means for resiliently connecting said members including cushioning bushings spaced from the axis of rotation and secured to one of said members and rods passing through said bushings and secured to the other of said members, and means for compressing and retaining said bushings.

7. A vibration-damping flywheel comprising a hub member adapted to be rigidly secured to a rotatable shaft, a momentum member, means for providing a bearing between said members to allow relative rotary movement in both directions but no relative radial movement including a bushing of bearing metal between said members, and means for resiliently connecting said members.

8. A vibration-damping flywheel comprising a hub adapted to be rigidly secured to a rotatable shaft, a momentum member, means for resiliently connecting said member to said hub including a cushioning device, and means for preventing conduction of heat to said device from said hub.

9. A vibration-damping flywheel comprising a hub member adapted to be rigidly secured to a rotatable shaft, a momentum member, bearing means for allowing relative rotary motion but no relative radial motion between said members, means for resiliently connecting said members including a flange having a hole spaced from the axis of rotation and secured to one of said members, a second flange secured to the other of said members and having a fastening device passing through said hole, and a cushioning bushing in said hole surrounding said device.

In testimony whereof I have hereunto set my hand.

HIRAM WALKER.